United States Patent
Kondrad et al.

(10) Patent No.: US 10,518,684 B2
(45) Date of Patent: Dec. 31, 2019

(54) VEHICLE SEAT BOLSTER

(71) Applicant: Ford Global Technologies, LLC, Dearborn, MI (US)

(72) Inventors: Marcos Silva Kondrad, Macomb Township, MI (US); Johnathan Andrew Line, Northville, MI (US); Kevin Wayne Preuss, Berkley, MI (US); S. M. Akbar Berry, Windsor (CA); Benjamin Yilma, Canton, MI (US); Brian Robert Spahn, Plymouth, MI (US); Alan George Dry, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/872,412

(22) Filed: Jan. 16, 2018

(65) Prior Publication Data
US 2019/0061587 A1    Feb. 28, 2019

Related U.S. Application Data

(60) Provisional application No. 62/550,098, filed on Aug. 25, 2017.

(51) Int. Cl.
| | |
|---|---|
| *B60N 2/90* | (2018.01) |
| *B60N 2/75* | (2018.01) |
| *B60N 2/12* | (2006.01) |
| *B60N 2/14* | (2006.01) |
| *B60N 2/64* | (2006.01) |

(52) U.S. Cl.
CPC ............... *B60N 2/99* (2018.02); *B60N 2/12* (2013.01); *B60N 2/14* (2013.01); *B60N 2/643* (2013.01); *B60N 2/75* (2018.02); *B60N 2/767* (2018.02); *B60N 2/79* (2018.02)

(58) Field of Classification Search
CPC ......... B60N 2/99; B60N 2/986; B60N 2/643; B60N 2/12; B60N 2/42; B60N 2/427; B60N 2/767; B60N 2/79; B60N 2/14
USPC .... 297/284.9, 250.1, 219.12, 256.12, 344.24
See application file for complete search history.

(56) References Cited

U.S. PATENT DOCUMENTS

| | | | |
|---|---|---|---|
| 3,924,893 A | 12/1975 | Ferrara | |
| 5,636,900 A * | 6/1997 | Wilkie | A61G 5/00 297/284.3 |
| 5,769,498 A | 6/1998 | Smith et al. | |
| 5,806,929 A * | 9/1998 | Choi | A47C 9/002 297/116 |
| 5,934,733 A | 8/1999 | Manwaring | |
| 6,273,495 B1 | 8/2001 | Haba et al. | |
| 6,478,372 B1 | 11/2002 | Lemmeyer et al. | |
| 6,485,101 B2 | 11/2002 | Kassai et al. | |

(Continued)

FOREIGN PATENT DOCUMENTS

| | | | | |
|---|---|---|---|---|
| DE | 19946565 C1 * | 4/2001 | ............... | B60N 2/26 |
| GB | 1098353 A * | 1/1968 | ........... | B60N 2/4492 |

*Primary Examiner* — Milton Nelson, Jr.
(74) *Attorney, Agent, or Firm* — Vichit Chea; Price Heneveld LLP

(57) ABSTRACT

A seat assembly is provided herein. The seat assembly includes a seat member having a support surface. A pair of seat member bolsters is disposed on opposing sides of the seat member. A seat base supports the seat member and has a wraparound sidewall that extends above a bottom portion of each seat member bolster.

20 Claims, 9 Drawing Sheets

(56) References Cited

U.S. PATENT DOCUMENTS

| | | | |
|---|---|---|---|
| 6,572,189 B1 * | 6/2003 | Blaymore | B60N 2/2806 |
| | | | 297/256.1 |
| 6,837,518 B2 | 1/2005 | Mullan | |
| 6,988,764 B2 | 1/2006 | Matsutani | |
| 7,055,904 B2 * | 6/2006 | Skelly | A47C 7/503 |
| | | | 297/284.9 |
| 7,837,267 B2 * | 11/2010 | Zink | B60N 2/2866 |
| | | | 297/378.12 |
| 9,193,285 B1 | 11/2015 | Jordan | |
| 9,486,087 B2 * | 11/2016 | Corbett | A61G 5/1043 |
| 9,610,869 B1 * | 4/2017 | Holley, Jr. | B60N 2/2881 |
| 2005/0264040 A1 | 12/2005 | Bailey et al. | |
| 2006/0076812 A1 * | 4/2006 | Ward | B60N 2/2881 |
| | | | 297/250.1 |
| 2006/0261508 A1 | 11/2006 | Lustiger et al. | |
| 2008/0136240 A1 * | 6/2008 | Matthews | B60N 2/4235 |
| | | | 297/354.1 |
| 2009/0218858 A1 * | 9/2009 | Lawall | B60N 2/4235 |
| | | | 297/216.1 |
| 2016/0311349 A1 * | 10/2016 | Honda | B60N 2/4626 |

* cited by examiner

VEHICLE SEAT BOLSTER

CROSS-REFERENCE TO RELATED APPLICATION

This application claims benefit from U.S. Provisional Patent Application No. 62/550,098, which was filed on Aug. 25, 2017, entitled "VEHICLE SEAT BOLSTER," the entire disclosure of which is hereby incorporated herein by reference.

FIELD OF THE INVENTION

The present disclosure generally relates to a seat assembly, and more particularly, to a seat assembly that may be used in autonomous vehicles, wherein the seat assembly faces in any desired direction. Accordingly, features of the seat assembly may be integrated into the seat assembly to accommodate the various positions a seat occupant may assume within the vehicle.

BACKGROUND OF THE INVENTION

Seat bolsters may be configured to inhibit lateral movement of an occupant disposed within a seat assembly. It is, therefore, desired to implement bolsters within vehicle seat assemblies.

SUMMARY OF THE INVENTION

According to one aspect of the present disclosure, a seat assembly is provided herein. The seat assembly includes a seat member having a support surface. A pair of seat member bolsters is disposed on opposing sides of the seat member. A seat base supports the seat member and has a wraparound sidewall that extends above a bottom portion of each seat member bolster.

According to another aspect of the present disclosure, a seat assembly is provided herein. The seat assembly includes a seat member having a support surface. A pair of pivotable seat member bolsters is disposed on opposing sides of the seat member. A seat base supports the seat member. The seat base inhibits the pair of seat member bolsters from outward movement through contact with the seat base.

According to yet another aspect of the present disclosure, a seat assembly is disclosed. The seat assembly includes a seat base supporting a seat member. A pair of pivotable seat member bolsters is disposed on opposing sides of the seat member. A seatback having a pair of seatback bolsters extends therefrom. The seat member bolsters and the seatback bolsters act as reaction surfaces that define a space in which an occupant is maintained.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 3:
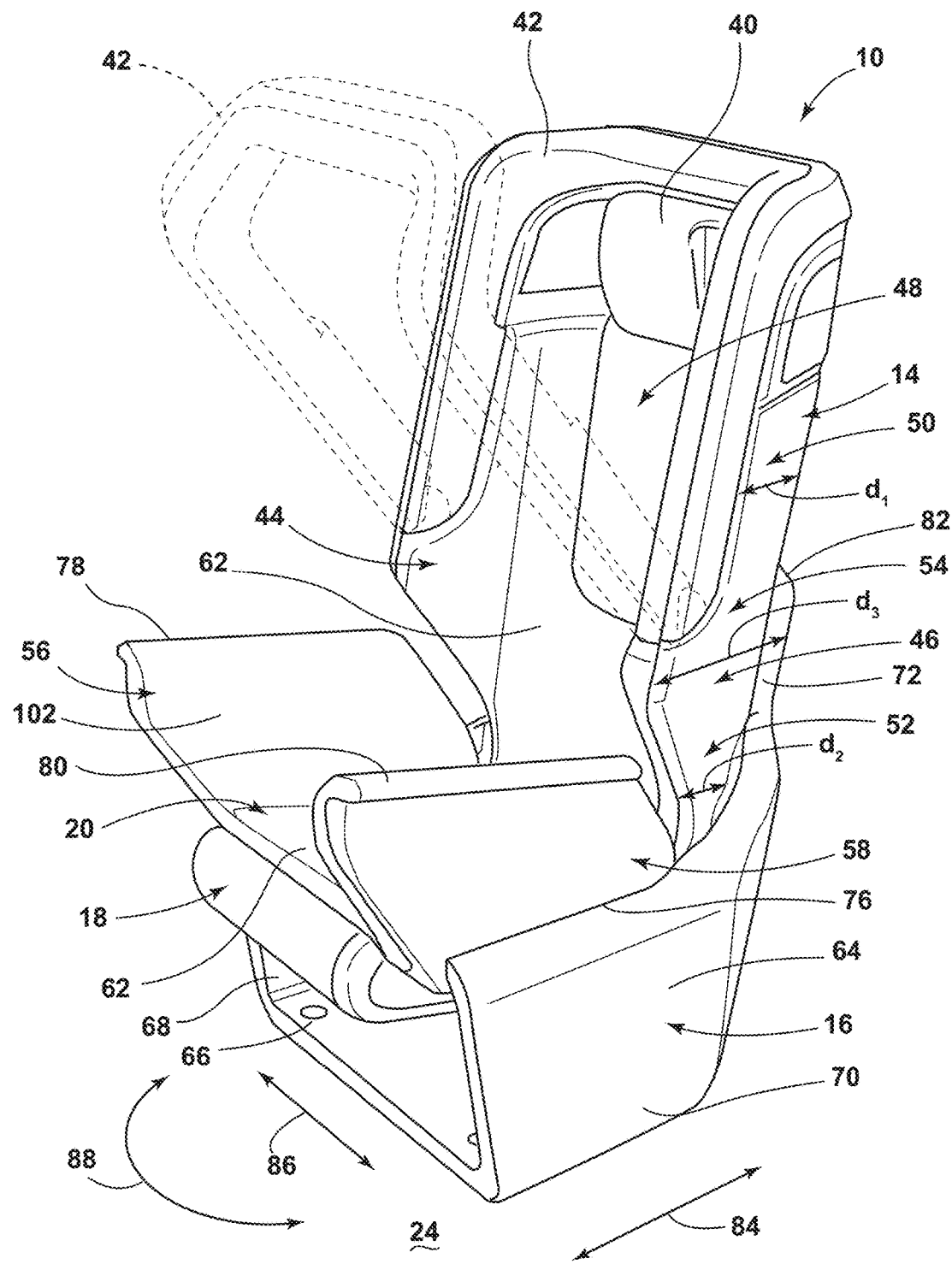
FIG. 3 is a side perspective view of the seat assembly, according to some examples.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a seat assembly that may be disposed with a vehicle. The seat assembly may include a seat member having a support surface. A pair of seat member bolsters may be disposed on opposing sides of the seat member. A seat base supports the seat member and has a wraparound sidewall that extends above a bottom portion of each seat member bolster. The seat assembly may be disposed in a vehicle that is capable of autonomous operation.

Figure 1:
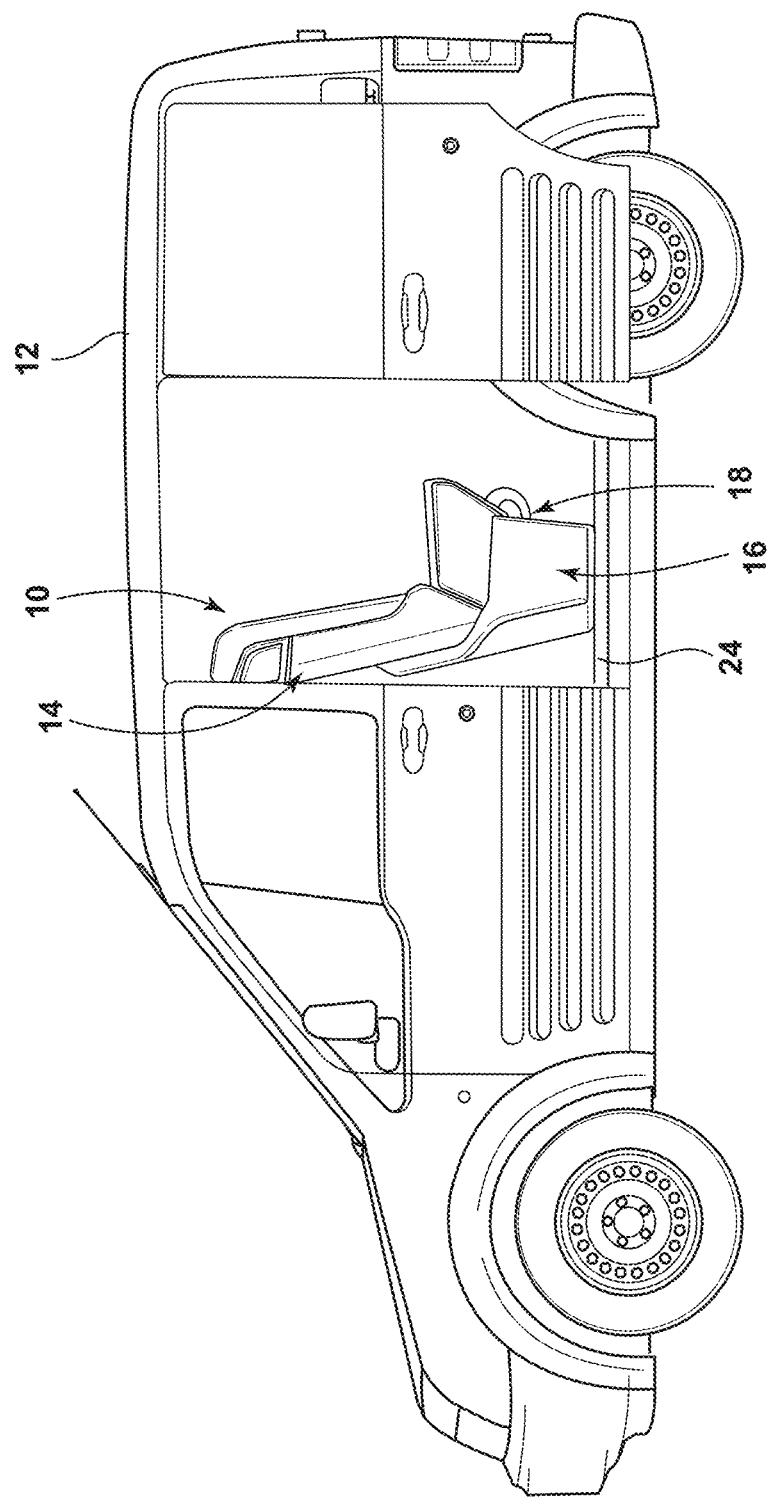
FIG. 1 is a side plan view of a vehicle incorporating a seat assembly therein, according to some examples.
Figure 4:
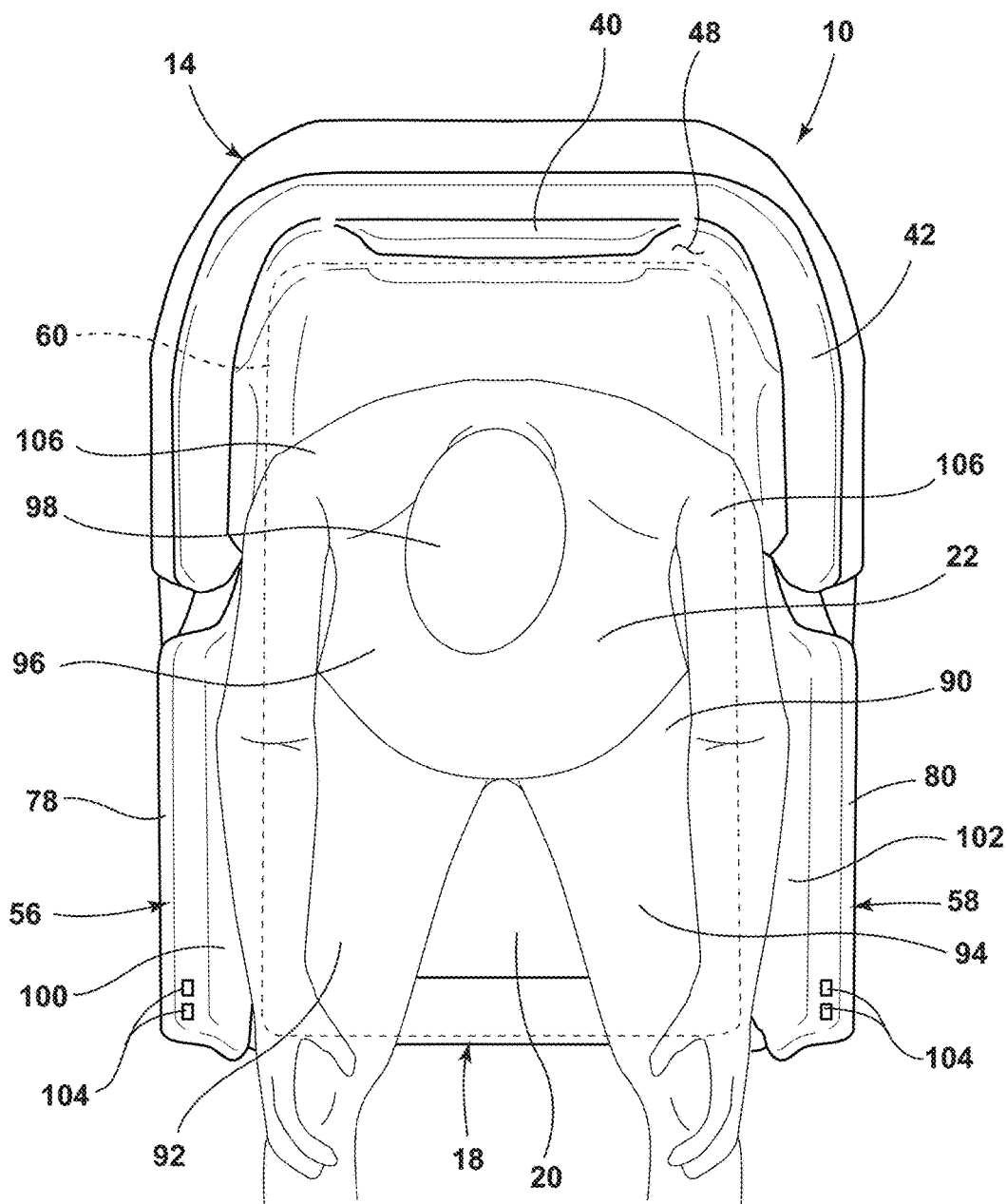
FIG. 4 is a top plan view of the seat assembly of FIG. 3.

Referring to FIG. 1, a seat assembly 10 is positioned within a vehicle 12. The seat assembly 10 may be movable and positioned in various locations throughout the vehicle 12 other than the illustrated position. The seat assembly 10 includes a seat base 16 that is coupled with a seatback 14, which is contemplated to be vertically adjustable relative to the seat member 18 and the seat base 16. The seat base 16 also supports a seat member 18 having a support surface 20 (FIG. 4) for supporting an occupant 22 (FIG. 4). The seat base 16 may be slidably and/or pivotably coupled with a floor 24 of the vehicle 12 to permit adjustment of the seat assembly 10 relative to the floor 24 of the vehicle 12. In some examples, however, the seat base 16 may be fixedly coupled with the floor 24 of the vehicle 12 without departing from the scope of the present disclosure.

Figure 2:
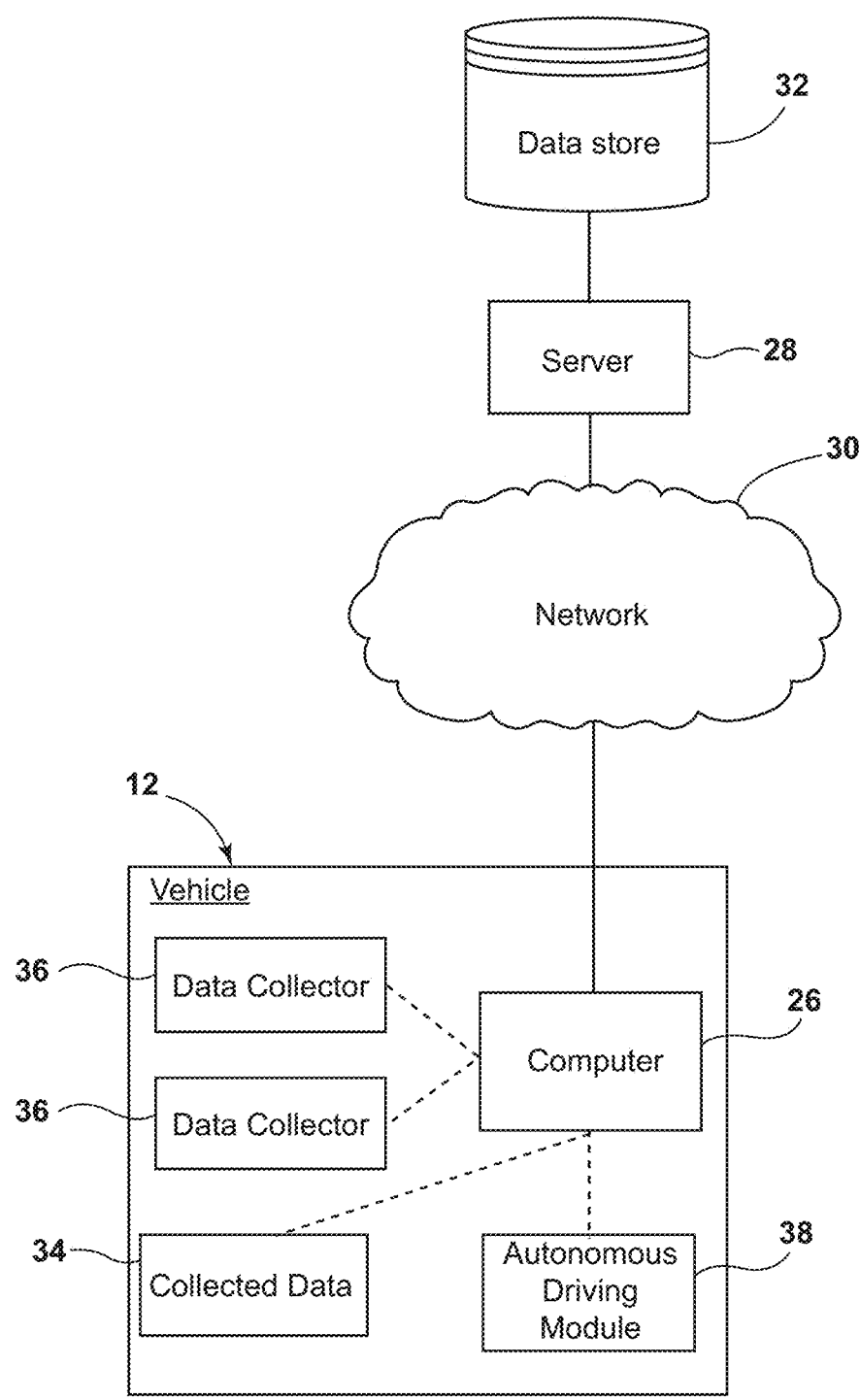
FIG. 2 is a block diagram of an exemplary autonomous vehicle system that may be employed by the vehicle, according to some examples.

Referring to FIG. 2, the vehicle 12 may be a manually operated vehicle (i.e. using a human driver) or may be autonomously driven by an onboard computer 26. Additionally, or alternatively, the vehicle 12 may be remotely controlled (e.g., via an operator located in a different location). In autonomous examples, one of which is exemplarily illustrated in FIG. 2, the computer 26 may be configured for communicating with one or more remote sites such as a server 28 via a network 30. The one or more remote sites may include a data store 32. The vehicle 12, including the computer 26, is configured to receive information, e.g., collected data 34, from one or more data collectors 36 related to various components of the vehicle 12, e.g., a steering wheel, brake pedal, accelerator pedal, gearshift lever, etc. The computer 26 generally includes an autonomous driving module 38 that includes instructions for autonomously, i.e., without some, or any, operator input, operating the vehicle 12, including possibly in response to instructions received from the server 28. Further, the computer 26, e.g., in the module 38, generally includes instructions for receiving data, e.g., from one or more data collectors 36, such as an interactive voice response (IVR) system, a graphical user interface (GUI) including a touchscreen or the like, etc.

By determining driver characteristics and/or vehicle operating conditions, the module 38 may determine an appropriate control or controls to be applied to one or more vehicle components. For example, the module 38 may determine whether and when a steering wheel should be moved to mimic or approximate vehicle steering being conducted as part of an autonomous driving operation, e.g., autonomous driving according to instructions from the server 28 and/or the module 38.

The vehicle computer 26 generally includes a controller having a processor and a memory, the memory including one or more forms of computer-readable media, and storing instructions executable by the processor for performing various operations. Further, the computer 26 may include more than one computing device, e.g., controllers or the like included in the vehicle 12 for monitoring and/or controlling various vehicle components, e.g., an engine control unit (ECU), transmission control unit (TCU), etc. The computer 26 may be generally configured for communications on a controller area network (CAN) bus or the like. The computer 26 may also have a connection to an onboard diagnostics connector (OBD-II). Via the CAN bus, the OBD-II, and/or other wired or wireless mechanisms, the computer 26 may transmit messages to various devices in the vehicle 12 and/or receive messages from the various devices, e.g., controllers, actuators, sensors, electronic devices, etc., including data collectors 36. In addition, the computer 26 may be configured for communicating with the network 30, which, may include various wired and/or wireless networking technologies, e.g., cellular, Bluetooth, wired and/or wireless packet networks, etc.

Instructions may be stored in and executed by the computer 26 in the autonomous driving module 38. Using data received in the computer 26, e.g., from the data collectors 36, the server 28, etc., the module 38 may control various vehicle 12 components and/or operations without a driver to operate the vehicle 12. For example, the module 38 may be used to regulate vehicle speed, acceleration, deceleration, steering, operation of components such as lights, windshield wipers, etc. Further, the module 38 may include instructions for evaluating information received in the computer 26 relating to vehicle 12 operator characteristics, e.g., from the data collectors 36.

The data collectors 36 may include a variety of vehicle equipment. For example, various controllers in the vehicle 12 may operate as data collectors 36 to provide data 34 via the CAN bus, e.g., data 34 relating to vehicle speed, acceleration, etc. Further, sensors or the like, global positioning system (GPS) equipment, navigation systems, etc., could be included in the vehicle 12 and configured as data collectors 36 to provide data to the computer 26, e.g., via a wired or wireless connection. Sensor data collectors 36 could include mechanisms such as RADAR, LIDAR, sonar, etc. sensors that could be deployed to measure a distance between the vehicle 12 and other vehicles or objects. Yet other sensor data collectors 36 could include cameras, breathalyzers, motion detectors, etc., i.e., data collectors 36 to provide data for evaluating a condition or mode of a vehicle 12 operator. In addition, the data collectors 36 may include sensors to detect a position, change in position, rate of change in position, etc., of vehicle components such as a steering wheel, brake pedal, accelerator, gearshift lever, etc.

The memory of the computer 26 generally stores the collected data 34. The data 34 is generally collected using the one or more data collectors 36, and may additionally include data calculated therefrom in the computer 26, and/or at the server 28. In general, the collected data 34 may include any data that may be gathered by a collection device and/or computed from such data 34. For example, the collected data 34, as mentioned above, may include data concerning a position, change in position, rate of change in position, etc., of the vehicle 12 components such as a steering wheel, brake pedal, accelerator, gearshift lever, etc.

The network 30 represents one or more mechanisms by which a vehicle computer 26 may communicate with a remote server 28. Accordingly, the network 30 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 30 include wireless communication networks (e.g., using Bluetooth, IEEE 802.11, etc.), local area networks (LAN), and/or wide area networks (WAN), including the internet, providing data communication services.

The server 28 may be one or more computer servers, each generally including at least one processor and at least one memory, the memory storing instructions executable by the processor, including instructions for carrying out various steps and processes. The server 28 may include or be communicatively coupled to a data store 32 for storing the collected data 34, as well as parameters for evaluating operator input, e.g., parameters for a specific vehicle operator, a specific vehicle 12, particular weather or other environmental conditions, etc. Further, the server 28 may store information related to multiple vehicles 12, traffic conditions, weather conditions, etc., within a geographic area, with respect to a particular road, city, etc. The server 28 could also be configured to provide drive-by-wire instructions to vehicles 12 in an autonomous driving area, e.g., a road, etc., such as an "all stop" instruction for all vehicles 12 to stop, a speed restriction, a lane restriction, etc.

In operation, the vehicle 12 may be operated in an autonomous mode with one or more vehicle occupants 22 (FIG. 4) disposed within one or more seat assemblies within the vehicle 12. The seat assembly 10 may be moved to various locations or positions within the vehicle 12. Due to numerous occupants 22 entering and exiting the vehicle 12 and the various positions of the seat assembly 10, the seat assembly 10 may include various safety features therein to protect occupants 22 of varying body types. The seat member bolsters 56, 58 and seatback bolsters 44, 46 may assist in maintaining the occupant 22 in the seat assembly 10 during lateral and cross-car loads and/or act as a reaction surface for the safety features disposed within the seat assembly 10.

Referring now to FIG. 3, the seat assembly 10 may be a highly contoured and stylized seat assembly 10 that may be configured for use in an autonomous vehicle 12, as provided herein, but is not limited to such use. The seat assembly 10 generally includes a seat member 18, which is supported by a seat base 16. In FIG. 3, the seatback 14 is generally shown in an upright use position for supporting a vehicle occupant 22 (FIG. 4) in an upright, seated position. The seat assembly 10 further includes a headrest assembly 40 that is integrated into the seatback 14.

With further reference to FIG. 3, a restraint bar 42 is coupled to the seatback 14. The restraint bar 42 may be coupled to a front portion of the seatback 14. The restraint bar 42 may be operable between a first position and a second position (shown in phantom). The restraint bar 42 may be equipped with at least one deployable safety feature, such as an airbag. The restraint bar 42 generally contours to the seatback 14 to present an occupant 22 with an integrated and aesthetically pleasing appearance. In some examples, the restraint bar 42 may be generally U-shaped.

Referring to FIGS. 3 and 4, the seatback 14 includes first and second seatback bolsters 44, 46 disposed on opposite sides of an inset contact surface 48. The seatback bolsters 44, 46 may have an upper region 50 that extends a first distance $d_1$ forwardly of a contact surface 48 of the seatback 14. A lower region 52 extends a second distance $d_2$ forwardly of the contact surface 48 of the seatback 14. A middle region 54 extends a third distance $d_3$ forwardly of the contact surface 48 of the seatback 14. In some examples, the second distance $d_2$ is less than the first distance $d_1$ and the third distance $d_3$ may be greater than the first and second distances $d_1$, $d_2$.

The seat member 18 similarly includes first and second seat member bolsters 56, 58, which extend outwardly from the generally inset support structure. In some instances, the seat member bolsters 56, 58 and the support structure may be formed as a cradle that is disposed on the seat base 16. The seat member 18 and the seatback 14 may include a coverstock 62 over portions thereof, which may be comprised of a flexible material (i.e., any material that may elastically deform). The coverstock 62 is configured to provide any desired aesthetic look and feel to the seat assembly 10.

The first and second seatback bolsters 44, 46 the first and second seat member bolsters 56, 58, the contact surface 48 of the seatback 14, and the support structure of the seat member 18, generally define a bucket seat configuration for the seat assembly 10 configured to cradle a seat occupant 22 and define a space 60 in which an occupant 22 is maintained. The first and second seat member bolsters 56, 58 and the first and second seatback bolsters 44, 46 are generally configured to cooperate to properly position, support, and retain a seat occupant 22 while riding in the vehicle 12, such as an autonomous vehicle. The cradling features of the first and second seat member bolsters 56, 58 and the first and second seatback bolsters 44, 46 provide load management to keep a seat occupant 22 in the seat assembly 10 during lateral and cross-car loads. Further, these cradling features may assist in maintaining a seat occupant 22 in a predefined position, or limit the positions in which an occupant 22 may be disposed, within the seat assembly 10 for a pre-activated restraint system in advance of a threat. With the seat occupant 22 located in a proper position within the space 60, the safety features incorporated into the seat assembly 10 and/or the vehicle can operate as intended during an impact event.

As further shown in FIG. 3, the seat base 16 includes a wraparound sidewall 64 that upwardly extends from a support portion 66. The wraparound sidewall 64 includes first and second side portions 68, 70 and a rear portion 72. In some examples, the seat member bolsters 56, 58 include outwardly extending top surfaces 78, 80. The top surface 78, 80 of each respective seat member bolster 56, 58 extends over a top surface 74, 76 of the respective first and second side portions 68, 70 of the wraparound sidewall 64. The rear portion 72 includes a raised central portion 82 and it is contemplated that one or both the rear portion 72 and the raised central portion 82 are operably coupled to the seatback 14 with a height adjustment mechanism disposed therebetween.

The support portion 66 is configured to be mounted to a support surface 20, such as a vehicle floor 24. The support portion 66 can be mounted to a track assembly for moving the seat assembly 10 between fore and aft positions (as indicated by arrow 84), and vehicle lateral (i.e., vehicle side-to-side) positions (as indicated by arrow 86). The seat assembly 10 can also be mounted to a swivel assembly to swivel the seat assembly 10 along the path as indicated by arrow 88. Thus, the seat assembly 10 can be oriented in forward facing and rearward facing directions within an autonomous vehicle, given the autonomous driving capabilities of an autonomous vehicle. As such, fixed mounting locations for safety features, such as dashboard-mounted airbag systems and column mounted airbag curtains, for example, may not be effective to a seat occupant 22 positioned in a non-forward facing direction. Thus, some safety features may be incorporated into the seat assembly 10 to move with the seat assembly 10 and retain consistent positions relative to the seat occupant 22.

Figure 5:
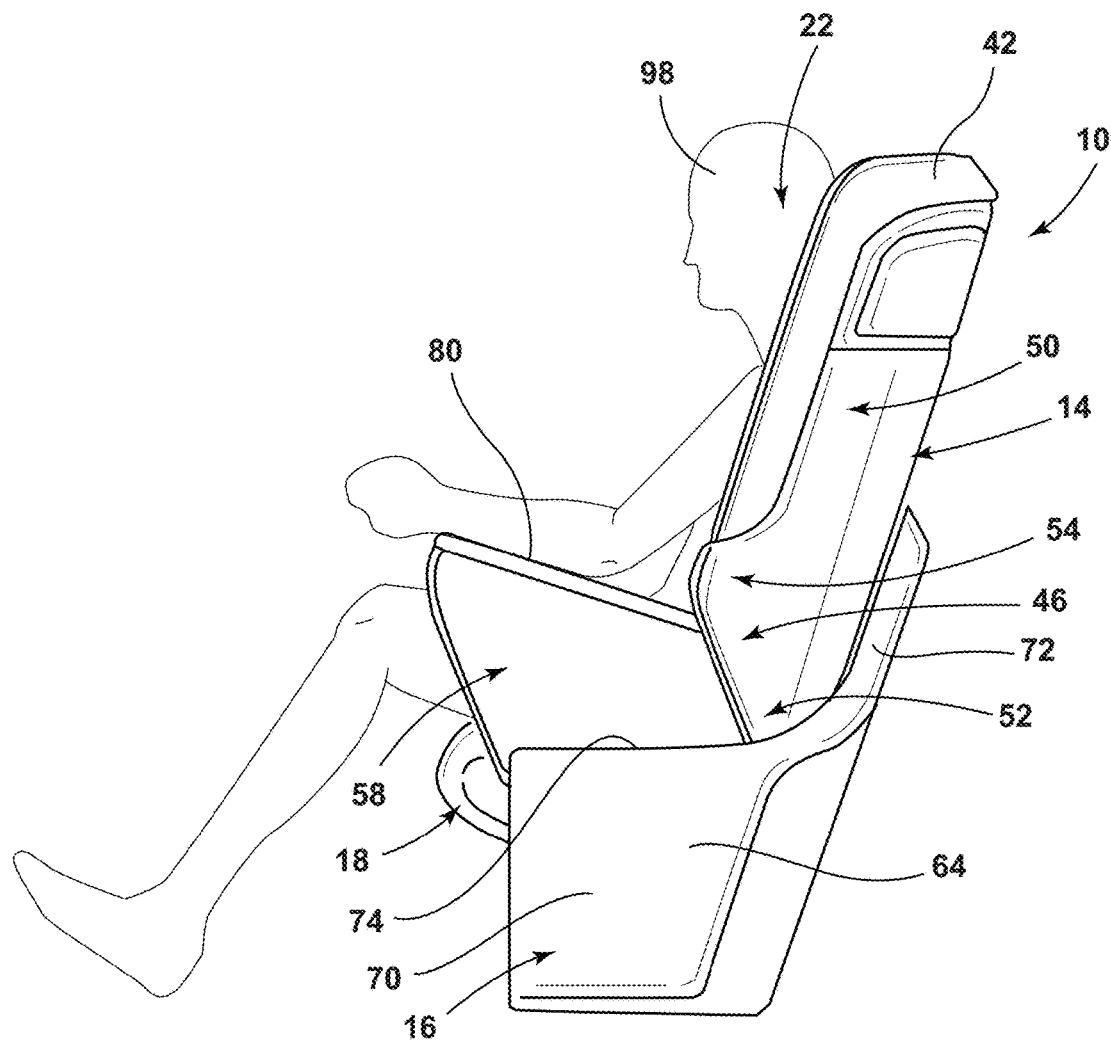
FIG. 5 is a side plan view of the seat assembly of FIG. 3.

Referring now to FIGS. 4 and 5, the seat occupant 22 has a posterior 90 and thighs 92, 94 that are supported on the support structure of the seat member 18. The vehicle occupant 22 further has a torso 96 that is generally supported by the contact surface 48 of the seatback 14 and a head 98 disposed adjacent to the headrest assembly 40. The thighs 92, 94 of the vehicle occupant 22 are supported on the support surface 20 of the seat member 18. In some examples, the occupant 22 may utilize the top surfaces 78, 80 of the seat member bolsters 56, 58 as an armrest. Accordingly, as provided herein, the seat member bolsters 56, 58 include the coverstock 62 (FIG. 3) that extends over an inner surface 100, 102 of each respective seat member bolster 56, 58 and/or along the top surfaces 78, 80 of each respective seat member bolster 56, 58. In various examples, a first coverstock material may be disposed over the inner surfaces 100, 102 while a second coverstock material may be disposed over the top surfaces 78, 80 of each respective seat member bolster 56, 58. It is contemplated that a padding may be disposed between the coverstock 62 and the substrate of each seat member bolster 56, 58.

With further reference to FIGS. 4 and 5, one or more controls 104 may be disposed within the seat member bolsters 56, 58 that control one or more functions of the vehicle 12 and/or the seat assembly 10. For example, the one or more controls 104 may control an audio system within the seat assembly 10 and/or the vehicle 12. The controls 104 may additionally and/or alternatively control a reclining feature and or any other desired feature of the seat assembly 10. It will be appreciated that the one or more controls 104 may control any other function of the vehicle 12 and/or seat assembly 10 without departing from the scope of the present disclosure.

Still referring to FIGS. 4 and 5, the seatback bolsters 44, 46 may extend forwardly of an occupant's shoulder 106 or any other upper body portion when the occupant's back is disposed on the contact surface 48 of the seatback 14. In some instances, when the occupant 22 places their head 98 against the headrest assembly 40, the seatback bolsters 44, 46 may also extend forwardly of the occupant's head 98. The encompassing of the occupant 22 may place the occupant 22 in a substantially known position so that any safety features integrated into the seat assembly 10 may be activated with known results. Accordingly, the seat member bolsters 56, 58 and the seatback bolsters 44, 46 may act as reaction surfaces for the safety features that are integrated within the seat assembly 10, such as side airbags.

Figure 6:
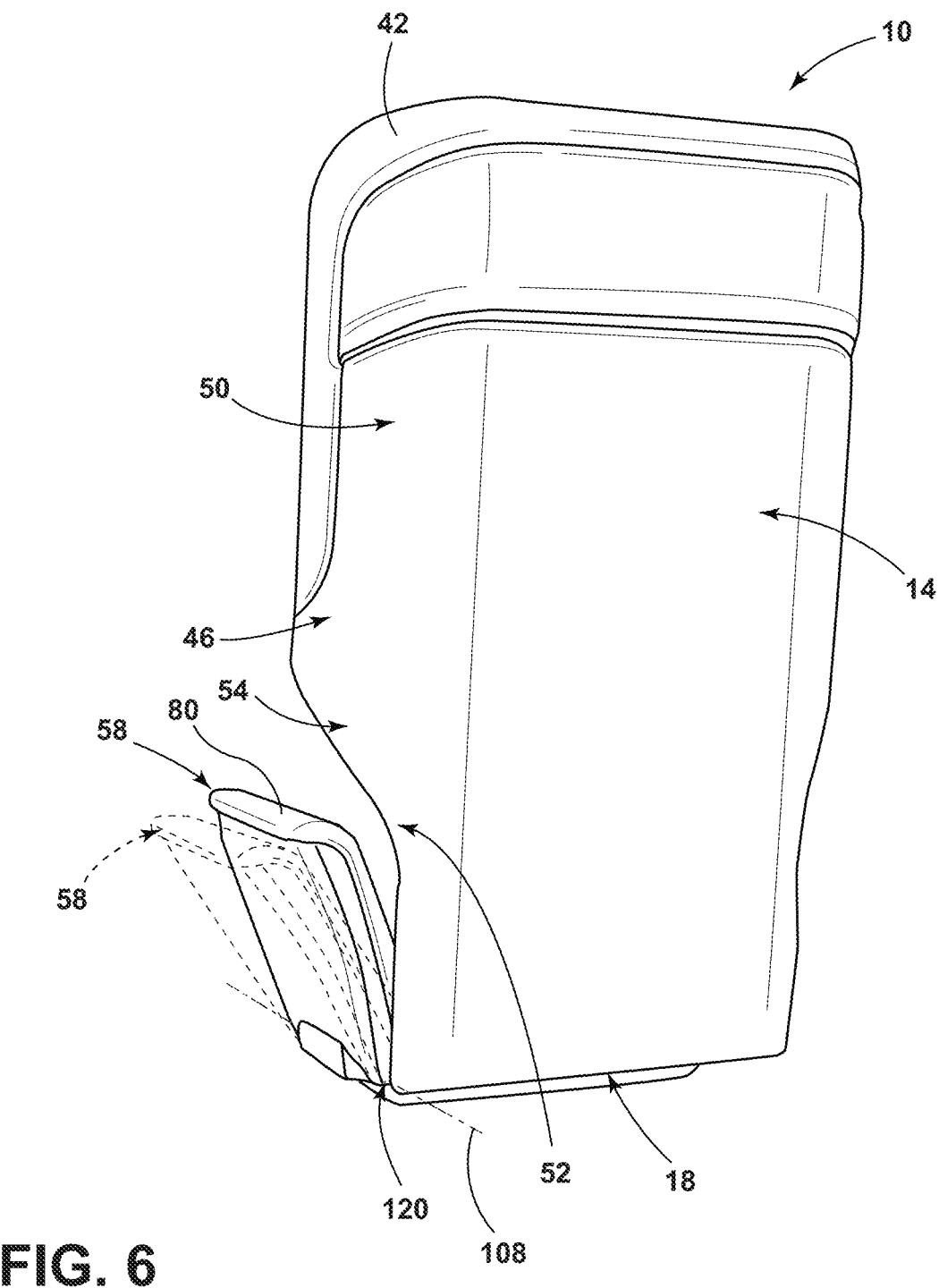
FIG. 6 is a rear perspective view of a seat member having a pair of bolsters and a seatback of the seat assembly, according to some examples.
Figure 7:
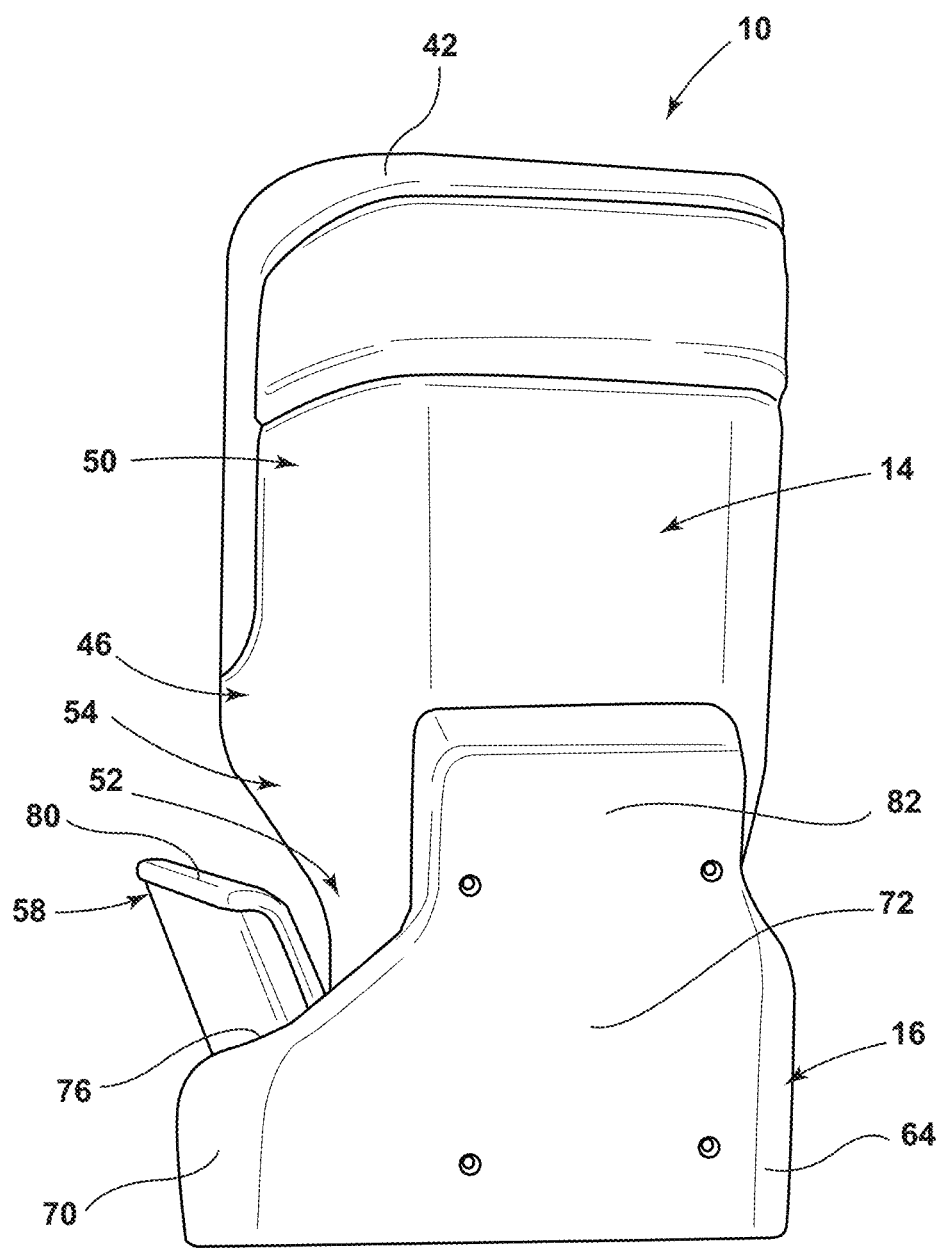
FIG. 7 is a rear perspective view of the seatback, the seat member, and a seat base of the seat assembly, according to some examples.

Referring to FIGS. 6 and 7, the seat member bolsters 56, 58 may be adjustable bolsters to adjust the amount of lateral support provided by the seat assembly 10 by adjusting the position of the seat member bolsters 56, 58 relative to the seat member 18. The adjustment is generally accomplished by pivoting the seat member bolsters 56, 58 laterally inward or towards the occupant 22 and/or laterally outward or away from the occupant 22 about a pivot point. Inward adjustment of the seat member bolsters 56, 58 relative to the seat member 18 results in a more vertically angled seat member bolster 56, 58 and thus increases the amount of lateral support provided by the seat assembly 10. As provided herein, in some examples, the seat member bolsters 56, 58 are pivotable about an axis 108 below the top surfaces 74, 76 of the first and second side portions 68, 70 of the wraparound sidewall 64.

The seat base 16 may limit outward pivoting of the seat member bolsters 56, 58. For example, the seat member bolsters 56, 58 may be inhibited from further outward movement through contact with the first and second side portions 68, 70 of the wraparound sidewall 64. The prevention of outward movement beyond a predefined location may ensure that the seat member bolsters 56, 58 may assist in maintaining the occupant 22 in the seat assembly 10 during lateral and cross-car loads and/or act as a reaction surface for the safety features disposed within the seat assembly 10.

Figure 8:
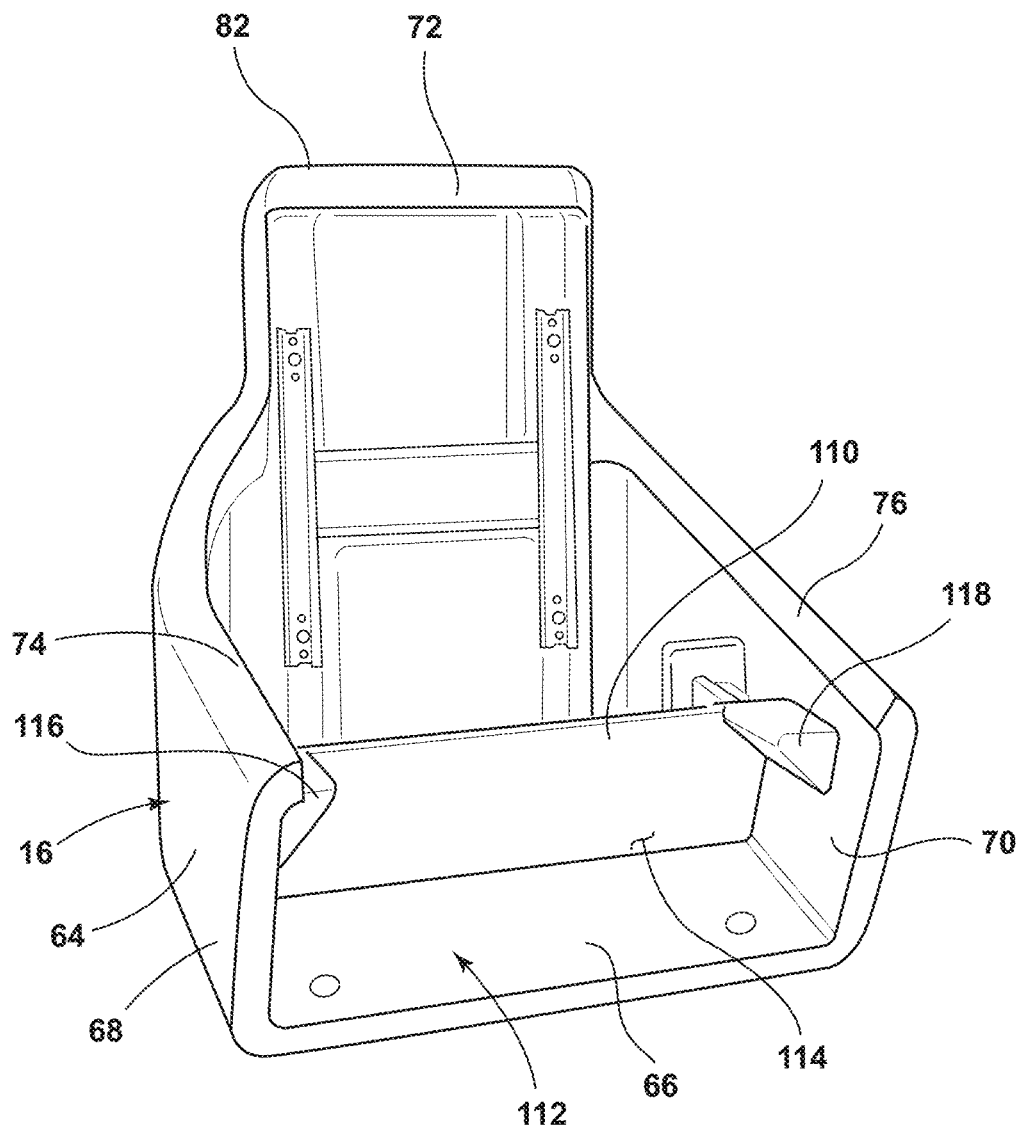
FIG. 8 is a front perspective view of the seat base, according to some examples.

Referring to FIG. 8, the seat base 16 may include a rigid wraparound sidewall 64. The wraparound sidewall 64 may include a divider 110 in a bottom portion 112 thereof. The first and second side portions 68, 70 of the wraparound sidewall 64 and the divider 110 may define an open cavity 114 in which items may be disposed. The divider 110 may prevent items disposed under the seat member 18 from being disposed under the seatback 14.

With further reference to FIG. 8, the seat base 16 further includes a pair of lateral protrusions 116, 118 that extend into the cavity 114. The lateral protrusions 116, 118 may provide support for the seat member 18. The lateral protrusions 116, 118 are disposed below the top surfaces 74, 76 of the respective first and second side portions 68, 70 of the wraparound sidewall 64. In some instances, the seat member 18 may be configured as a cradle that includes the seat portion and the seat member bolsters 56, 58. The cradle may be disposed within the seat base 16 and a bottom portion 120 (FIG. 6) of the seat member bolsters 56, 58 may be disposed below the top surfaces 74, 76 of the first and second side portions 68, 70 of the sidewall 64. As provided herein, the seat member bolsters 56, 58 may be inhibited from outward pivotable movement once the seat member bolsters 56, 58 contact the first and second side portions 68, 70 of the wraparound sidewall 64.

Referring still to FIG. 8, the seat base 16 includes the raised central portion 82 that is disposed rearwardly of the seatback 14. Like the first and second side portions 68, 70 of the wraparound sidewall 64, the raised central portion 82 of the seat base 16 may inhibit movement of the seatback 14 past the raised central portion 82. Accordingly, the occupant 22 may be disposed in a substantially fixed position on opposing lateral sides and rearwardly. Due to the fixed position, safety features may be integrated into the seat and effectively protect variously sized occupants 22.

Figure 9:
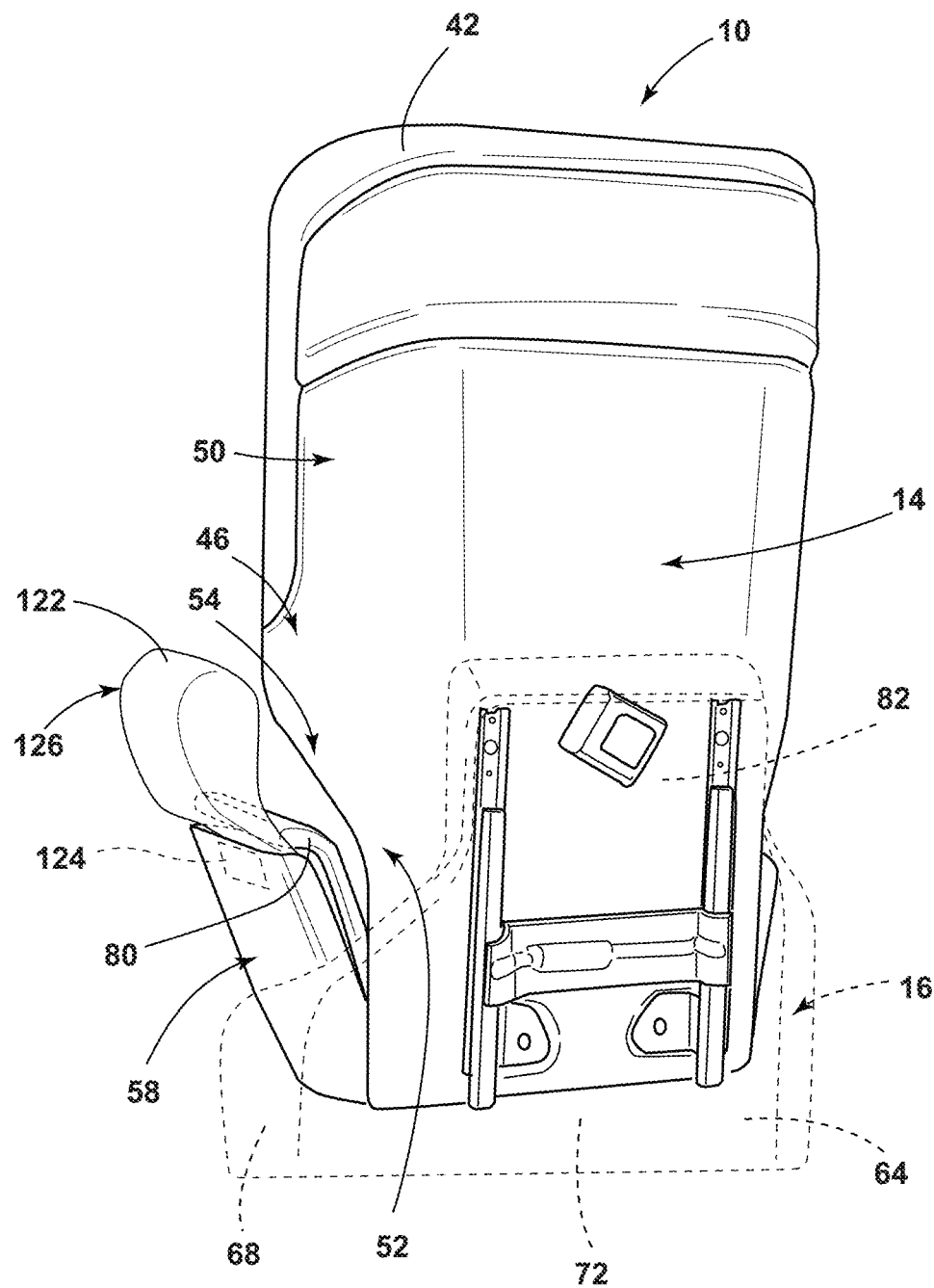
FIG. 9 is a rear perspective view of the seatback and seat member having an airbag extending from a bolster, according to some examples.

Referring to FIG. 9, in some examples, the seat member bolsters 56, 58 may include a bolster airbag 122. A crash pulse module may be operably coupled to an airbag deployment system 124. The crash pulse module is configured to determine whether a collision event has occurred and further determine whether the collision event is a frontal collision event, a side collision event, or another collision event. The bolster airbag 122 is configured to provide protection to the occupant 22 of the seat assembly 10 during a collision event. The bolster airbag 122 begins in a deflated position and may be generally folded and disposed in the bolsters, hidden from view. Upon the crash pulse module detecting the collision event, the airbag deployment system 124 signals an inflator to produce a gas, which travels through a line and moves the bolster airbag 122 to an inflated position 126, as shown in FIG. 9.

Use of the present disclosure may offer a variety of advantages. For instance, use of the seat assembly provides for safety features integrated within the seat assembly. The seat assembly may include bolsters that maintain the occupant within a predefined space. In the event of a collision event, the known placement of the occupant helps to ensure that the safety features perform as intended to best protect the occupant. The seat assembly may be disposed within an autonomous vehicle.

According to various examples, a seat assembly is provided herein. The seat assembly includes a seat member having a support surface. A pair of seat member bolsters is disposed on opposing sides of the seat member. A seat base supports the seat member and has a wraparound sidewall that extends above a bottom portion of each seat member bolster. Examples of the seat assembly can include any one or a combination of the following features:

the seat member bolsters include an outwardly extending top surface, the top surface extending over the wraparound sidewall;

a seatback operably coupled with the seat base;

a seat cover covering the support surface;

the seatback defines lateral seatback bolsters having an upper region that extends a first distance forwardly of a contact surface of the seatback and a lower region that extends a second distance forwardly of a contact surface of the seatback, the second distance less than the first distance;

the seatback bolsters include a middle region that extends a third distance forwardly of the contact surface of the seatback, the third distance greater than the first and second distances;

the pair of seat member bolsters are pivotable about a point below a top surface of the seat base;

the seat member bolsters are configured as armrests for an occupant disposed on the support surface;

the seat member bolsters are inhibited from further outward movement through contact with first and second side portions of the wraparound sidewall;

a bolster airbag disposed within at least one of the pair of seat member bolsters; and/or one or more controls disposed within the seat member bolsters that control one or more functions of the seat assembly.

Moreover, a method of manufacturing a seat assembly is provided herein. The method includes forming a seat member having a support surface. A pair of seat member bolsters is coupled on opposing sides of the seat member. The seat member is attached to a seat base. The seat base has a wraparound sidewall that extends above a bottom portion of each seat member bolster.

According to some examples, a seat assembly is provided herein. The seat assembly includes a seat member having a support surface. A pair of pivotable seat member bolsters is disposed on opposing sides of the seat member. A seat base supports the seat member. The seat base inhibits the pair of seat member bolsters from outward movement through contact with the seat base. Examples of the seat assembly can include any one or a combination of the following features:

a seat cover disposed over the seat member and the pair of seat member bolsters and is at least partially comprised of a flexible material;

a seatback operably coupled with the seat base;

the seat member bolsters are configured as armrests for an occupant disposed on the support surface; and/or the seat base is slidably and pivotably coupled with a floor of a vehicle to permit adjustment of the seat assembly relative to the floor of the vehicle.

According to other examples, a seat assembly is disclosed. The seat assembly includes a seat base supporting a seat member. A pair of pivotable seat member bolsters is disposed on opposing sides of the seat member. A seatback having a pair of seatback bolsters extends therefrom. The seat member bolsters and the seatback bolsters act as reaction surfaces that define a space in which an occupant is maintained. Examples of the seat assembly can include any one or a combination of the following features:

one or more controls disposed within the seat member bolsters that control one or more functions of the seat assembly;

the seat member bolsters are further configured as armrests for an occupant disposed on a support surface of the seat member; and/or the seat base is configured to swivel.

It will be understood by one having ordinary skill in the art that construction of the described invention and other components are not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting. It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seat assembly, comprising:
a seat member having a support surface;
a pair of pivotable seat member bolsters disposed on opposing sides of the seat member; and
a seat base supporting the seat member and having a wraparound sidewall that extends continuously from a front edge of one of the pair of pivotable seat member bolsters to a front edge of another of the pair of pivotable seat member bolsters, wherein the wraparound sidewall includes first and second side portions, each of the first and second side portions having a top surface positioned exterior of and above a bottom portion of one of the pair of seat member bolsters, and further wherein each of the pair of seat member bolsters extends vertically beyond the top surface of the respective side portion of the first and second side portions.

2. The seat assembly of claim 1, wherein each of the pair of pivotable seat member bolsters includes an outwardly extending bolster top surface, the bolster top surface extending over the wraparound sidewall.

3. The seat assembly of claim 1, further comprising:
a seat cover covering the support surface.

4. The seat assembly of claim 1, further comprising:
a seatback operably coupled with the seat base.

5. The seat assembly of claim 4, wherein the seatback defines lateral seatback bolsters having an upper region that extends a first distance forwardly of a contact surface of the seatback and a lower region that extends a second distance forwardly of a contact surface of the seatback, the second distance less than the first distance.

6. The seat assembly of claim 5, wherein the seatback bolsters include a middle region that extends a third distance forwardly of the contact surface of the seatback, the third distance greater than the first and second distances.

7. The seat assembly of claim 1, wherein the pair of seat member bolsters are pivotable about a point below a top surface of the seat base.

8. The seat assembly of claim 7, wherein the pair of pivotable seat member bolsters are inhibited from further outward movement through contact with the first and second side portions of the wraparound sidewall.

9. The seat assembly of claim 1, wherein the pair of pivotable seat member bolsters are configured as armrests for an occupant disposed on the support surface.

10. The seat assembly of claim 1, further comprising:
a bolster airbag disposed within at least one of the pair of pivotable seat member bolsters.

11. The seat assembly of claim 1, further comprising:
one or more controls disposed within at least one of the pair of pivotable seat member bolsters that control one or more functions of the seat assembly.

12. A seat assembly, comprising:
a seat member having a support surface;
a pair of pivotable seat member bolsters disposed on opposing sides of the seat member; and
a seat base supporting the seat member and including a wraparound sidewall, the wraparound sidewall having first and second side portions, wherein a top surface of each of the first and second side portions of the wraparound sidewall extends above an axis of rotation of one of the pair of pivotable seat member bolsters, each of the pair of pivotable seat member bolsters having a bolster top surface vertically spaced apart from the top surface of the respective side portion of the first and second side portions, and further wherein the top surface of each of the first and second side portions contacts the respective seat member bolster to inhibit the pair of seat member bolsters from outward movement.

13. The seat assembly of claim 12, further comprising:
a seat cover disposed over the seat member and the pair of seat member bolsters and is at least partially comprised of a flexible material.

14. The seat assembly of claim 12, further comprising:
a seatback operably coupled with the seat base.

15. The seat assembly of claim 14, wherein the pair of seat member bolsters are configured as armrests for an occupant disposed on the support surface.

16. The seat assembly of claim 15, wherein the seat base is slidably and pivotably coupled with a floor of a vehicle to permit adjustment of the seat assembly relative to the floor of the vehicle.

17. A seat assembly, comprising:
a seat base supporting a seat member;
a pair of pivotable seat member bolsters disposed on opposing sides of the seat member;
a seatback having a pair of seatback bolsters extending therefrom, wherein each of the pair of seatback bolsters has an upper region that extends a first distance forwardly of a contact surface of the seatback and a lower region that extends a second distance forwardly of a contact surface of the seatback, the second distance less than the first distance, and further wherein the seat member bolsters and the seatback bolsters act as reaction surfaces that define a space in which an occupant is maintained; and
a wraparound sidewall that includes integrally formed first and second side portions and a rear portion, wherein each of the first and second side portions are positioned exterior of one of the pair of pivotable seat member bolsters and the rear portion is coupled to the seatback.

18. The seat assembly of claim 17, further comprising:
one or more controls disposed within at least one of the pair of seat member bolsters that control one or more functions of the seat assembly.

19. The seat assembly of claim 17, wherein the pair of seat member bolsters are further configured as armrests for an occupant disposed on a support surface of the seat member.

20. The seat assembly of claim 19, wherein the seat base is configured to swivel.

* * * * *